(12) United States Patent
Bixler

(10) Patent No.: US 6,507,351 B1
(45) Date of Patent: Jan. 14, 2003

(54) SYSTEM FOR MANAGING PERSONAL AND GROUP NETWORKED INFORMATION

(76) Inventor: Donald Brinton Bixler, 11574 Hemingway Dr., Reston, VA (US) 20194

( * ) Notice: Subject to any disclaimer, the term of this patent is extended or adjusted under 35 U.S.C. 154(b) by 0 days.

(21) Appl. No.: 09/457,139

(22) Filed: Dec. 8, 1999

Related U.S. Application Data

(60) Provisional application No. 60/111,532, filed on Dec. 9, 1998.

(51) Int. Cl.[7] .................................................. G06F 3/00
(52) U.S. Cl. ...................... 345/810; 345/733; 345/738; 345/740; 345/741; 345/825; 345/867; 709/201
(58) Field of Search ................................. 345/810, 812, 345/825, 826, 733, 738, 739, 741, 748, 740, 751, 867; 707/10; 709/201, 217, 207

(56) References Cited

U.S. PATENT DOCUMENTS

| | | | |
|---|---|---|---|
| 4,707,852 A | * 11/1987 | Jahr et al. | 379/106.03 |
| 5,506,955 A | * 4/1996 | Chen et al. | 714/26 |
| 5,680,535 A | 10/1997 | Harbin et al. | |
| 6,005,544 A | * 2/1998 | Eglit | 700/500.1 |
| 5,738,527 A | 4/1998 | Lundberg | |
| 5,748,190 A | 5/1998 | Kjorsvik | |
| 5,796,945 A | 8/1998 | Tarabella | |
| 5,819,284 A | 10/1998 | Farber et al. | |
| 5,850,220 A | 12/1998 | Motai | |
| 5,884,035 A | 3/1999 | Butman et al. | |
| 5,905,492 A | 5/1999 | Straub et al. | |
| 5,905,988 A | 5/1999 | Schwartz et al. | |
| 5,913,040 A | 6/1999 | Rakavy et al. | |
| 5,930,501 A | 7/1999 | Neil | |
| 5,959,621 A | * 9/1999 | Nawaz et al. | 345/733 |
| 5,978,807 A | 11/1999 | Mano et al. | |
| 6,088,717 A | * 7/2000 | Reed et al. | 709/201 |
| 6,232,973 B1 | * 5/2001 | Dow et al. | 345/810 |
| 6,272,537 B1 | * 8/2001 | Kekic et al. | 709/223 |
| 6,297,836 B1 | * 10/2001 | Kurashina | 345/684 |

OTHER PUBLICATIONS

"http://hotfiles.zdnet.com", Web Site Pages, 6 Pages, Printed Out on Sep. 3, 1999 (Origination Date Unknown).
"http://hotfiles.zdnet.com", Web Site pages, 18 Pages, Printed Out on Sep. 16, 1999 (Origination Date Unknown).
Veen, Jeffrey, "The Big Push for Passive Viewing", Sep. 9, 1996, © 1994–99 Wired Digital Inc., 2 pgs.

* cited by examiner

*Primary Examiner*—Raymond J. Bayerl
*Assistant Examiner*—Cuong T. Thai
(74) *Attorney, Agent, or Firm*—Nixon & Vanderhye P.C.

(57) ABSTRACT

An information management system and method for a computer provides a user-interface tool for automatically acquiring and displaying information acquired from multiple sources such as locally resident utility programs and data files or remote computers and servers accessed via the Internet or through a LAN/WAN communications link. The information management system is provided as a software utility program embodied in a computer-readable medium for loading and executing on a computer system having a display device. Upon execution of the information management system utility program by a host computer, a database is created locally to store information source location data and various display criteria. In an initial mode of operation, a settings menu is provided via a display device for selecting the information sources for acquiring data, inputting various properties concerning the selected information sources and selecting desired display characteristics. Subsequently, the system operates in a "screen saver" mode wherein selected information contained in the database or acquired from the selected sources is sequentially displayed in a bit-mapped graphics window after the computer has been idle for a predetermined period. Displayed information is updated at pre-selected intervals by automatically accessing the information sources.

23 Claims, 14 Drawing Sheets

SYSTEM FOR MANAGING PERSONAL AND GROUP NETWORKED INFORMATION

This application claims the benefit of U.S. Provisional Application No. 60/111,532, filed Dec. 9, 1998, the entire content of which is hereby incorporated by reference in this application, Pending.

FIELD OF THE INVENTION

The present invention relates generally to information acquisition, management and display in computer systems, and more particularly, to a computer program product, method and system for managing and displaying utility programs, user-defined data and digital communications network-accessible information on a personal computer device.

COPYRIGHT NOTICE

A portion of the disclosure of this patent document contains material that is subject to copyright protection. The copyright owner has no objection to the facsimile reproduction by anyone of this patent document or the patent disclosure as it appears in the Patent and Trademark Office patent prosecution file or records, but otherwise reserves all copyright rights whatsoever.

BACKGROUND AND SUMMARY OF THE INVENTION

As the accessibility, amount and exchange of digital information increases, individuals are increasingly motivated to use various computer software applications to assist in the daily planning and management of information critical to their personal and business activities. Because this information may manifest itself in a wide range and diversity of forms and may be produced by software applications resident on an individual's computer or be received from multiple and remote sources via Local and Wide Area Network (LAN/WAN) communication links or the Internet, there is a need for an information management tool for personal computer systems that can integrate and simplify the tasks of data acquisition, management and presentation of a variety of diverse types of information acquired from a variety of different information sources.

Although various commercial utility programs are available for use on a PC (personal computer) or other computer device to manage individual components and/or subsets of personal and business information, the computer-user must typically activate separate software applications to obtain access to different types of data. Moreover, many conventional commercial software applications are designed for managing information pertaining solely to a business or corporate operations, while other applications are designed solely for managing personal information. This situation presents a problem in that the user must routinely reactivate each individual software utility application each time access or display of particular information is desired. In addition, one may be required to individually activate and switch between using separate software applications for accessing e-mail, scheduling appointments, making personal task lists, and accessing internet World Wide Web-sites, etc. Moreover, as an added inconvenience, the computer-user must maintain a relatively high degree of familiarity with the operation of a multiplicity of different computer programs.

Another problem with conventional information management programs is that whenever one desires to assemble and/or update specific items of information, one is typically required to search, track, acquire and assemble the information for display manually. Often during this acquisition and tracking process, important information is lost or forgotten in the process of sorting through the volume of other less relevant information. Consequently, it would be desirable to have a software application for managing a wide range of both personal and business information, such as e-mail, scheduling and appointment data, personal task and "to-do" list data, spread-sheet data, Internet web-site content, conventional text and graphical file data, that would provide users with an automatic tool for acquiring, organizing and displaying selected information in a convenient and automatic manner that facilitates viewing for learning, memorization and general utilization. Along the same lines, it would also be desirable to have a single information-management utility for a personal computer device that provided some convenient means for facilitating the learning and memorization of selected information items and/or provided means for reminding the computer-user of selected information items at predetermined times or intervals. The present invention addresses these and other problems inherent to computerized personal information management by providing a system and method for routinely and automatically acquiring and displaying information from multiple selected digital information sources in a manner that enhances the efficiency and ability of a computer-user to effectively view, utilize, study and remember the selected information.

In one aspect, the present invention is a computer program product and software utility application, suitable for execution on a variety of computer systems having a user I/O interface and display device, that operates as a "screen saver" type application that allows a user to integrate and display a variety of different types of information acquired from a variety of local and remote sources such as, for example, e-mail, personal appointment reminder and calendar applications, task-scheduling applications and other conventional software utility programs. In another aspect, the present invention is a computer system and method for automatically acquiring and displaying information obtained from local and remote data sources, including both local files or other resident software utility applications and remote computers or servers connected to the computer system via LAN/WAN or other digital data communications links.

In accordance with the present invention, an information management system is provided as a software utility program embodied in a computer-readable medium for loading and executing on a computer system having an associated display device or other computer device having a display (e.g., a PDA, laptop, etc.). Once the information management system software is executed on a host computer, a database is created to store set-up instructional information and data acquired from various user-selected information sources. The information contained in the database may also be updated at pre-selected intervals by an automatic accessing of the appropriate information sources without the need for subsequent user interaction. In an initial mode of operation, set-up menus are provided on the display device in bit-mapped graphics windows for selecting the information sources for acquiring data, inputting various properties concerning the selected information sources and selecting display characteristics. Using the set-up menus, the host computer user can select specific "filter" characteristics to be applied to each type or source of acquired information and display characteristics for displaying the information. These filter characteristics include data selection and display information for determining, for example, the file location or source of data to acquire and display, file or source names, font type, size and color for displaying text, background page color, display frequency or cycle and duration, etc. Thereafter, the system operates in a "screen saver" mode wherein selected information stored locally or contained in the database is sequentially displayed, for example, in a bit-mapped graphics window after the computer has been idle for a predetermined period. In addition, the user can immediately deactivate the "screen saver" mode and activate a desired software program via, for example, a simple keyboard command or "mouse" operation.

One advantage of the present invention is that it operates as a automatic visual reminder to the user of a computer device to perform various tasks, such as reading e-mail and editing appointment or "to do" lists, and provides a convenient vehicle for performing such tasks. An additional advantage is that information from various sources can be combined together for viewing on a single display "page" or sequentially on a plurality of display pages. For example, using the present invention, appointment data from resident software program (i.e., a program stored on the user's computer system) can be combined with appointment data obtained from a content residing remotely at a particular Internet site. Another advantage of the present invention is that it can be used to enhance the performance of corporate or other organizational teams of individuals through the use of common screen displays and the sharing of operational and performance data among team members via a LAN or WAN communications link. For example, using the present invention, team performance metrics and accomplishments can be displayed uniformly and routinely to all team members without the need for team members to each individually access multiple data files or programs. Moreover, information can be easily updated from a central location and distributed to all team members via Local/Wide Area Networks or the Internet. In addition, information compiled by different utility programs can be selected so that information from each program can be displayed on a single page. For example, multiple e-mail programs can be identified and information from multiple programs can be displayed on a single or sequential display page(s). In this way, a user can monitor e-mail from various sources without having to activate separate e-mail programs.

Another advantage of the present invention provides a means for enhancing a person's ability to memorize selected information through the repeated displaying of selected user-defined data. For example, information acquired from pre-selected sources and files or information created and stored locally in a user-created file may be repeatedly displayed at predetermined selected intervals. A further feature of the present invention provides for the automatic accessing of selected Internet sites and for the retrieving and displaying of selected information content provided by those sites. A display of selected Internet sites and URL addresses is provided during a set-up process or the user can direct the system to immediately access a desired Internet site by a simple keyboard or mouse command. Additionally, Internet content can be automatically "pulled" from a site provider at predetermined times and then stored in a local database for later display. For example, once the appropriate set-up selection information has been entered, Internet web-site content and updates, such as confirmation of on-line travel reservations, results of bids submitted on Internet auction sites, etc., can be automatically acquired on a routine basis and repetitively displayed without further action by the user.

BRIEF DESCRIPTION OF THE DRAWINGS

These as well as other features of this invention will be better appreciated by reading the following detailed description of presently preferred exemplary embodiments taken in conjunction with the accompanying drawings of which.

DETAILED DESCRIPTION OF THE PRESENTLY PREFERRED EMBODIMENT

In the following description, for purposes of explanation and not limitation, specific details are set forth, such as particular data structures, program flowcharts, system schematics, network interfaces, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so as not to obscure the description of the present invention with unnecessary detail.

Figure 1:
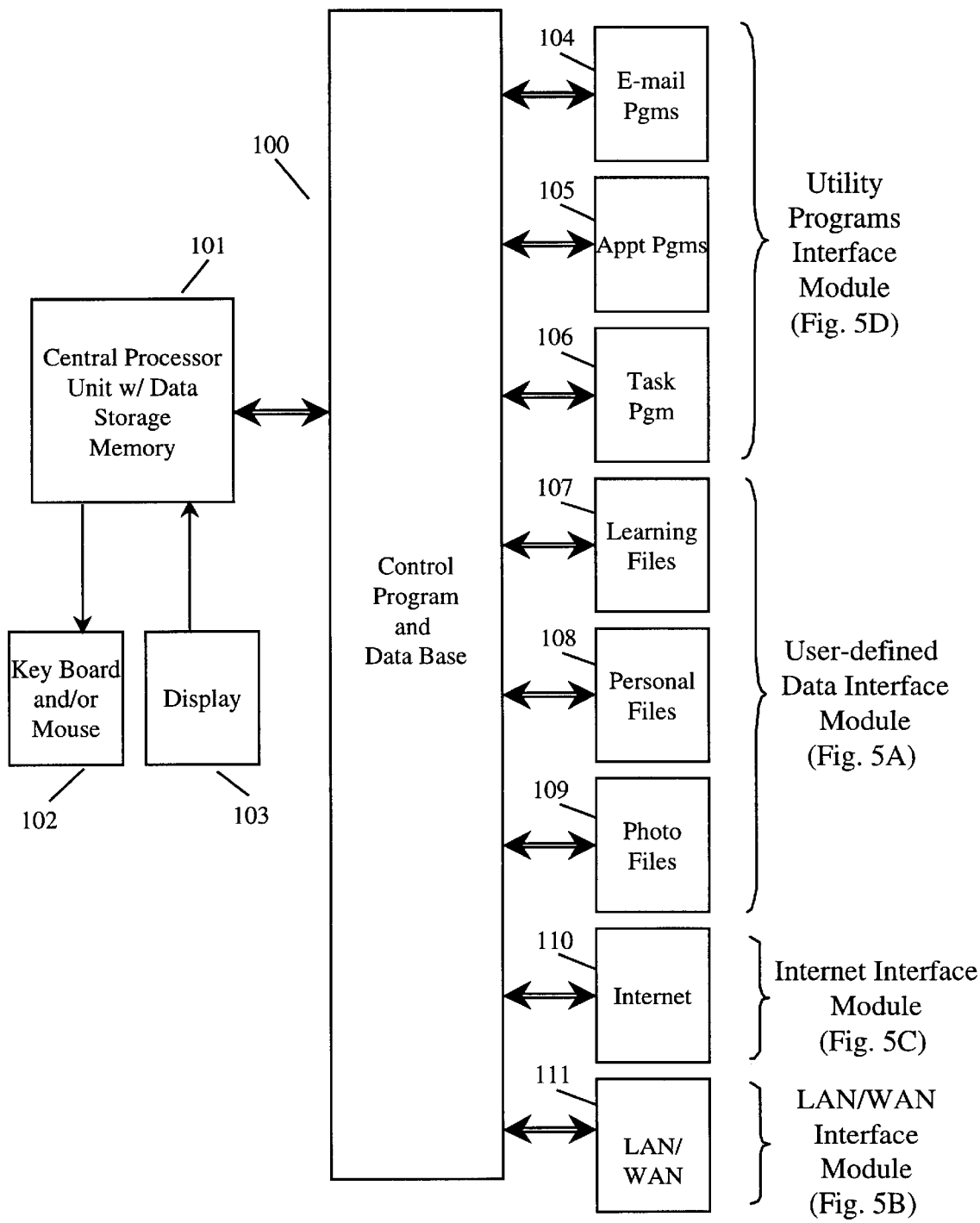
FIG. 1 is a block diagram of an example computer processor and operating system environment in which the present invention may be embodied.

FIG. 1 shows an example conventional personal computer system in which the information management operating system 10 of the present invention may be embodied. Computer system 101–103 includes, for example, a CPU with a data storage memory 101, a keyboard/mouse user-interface 102 and a display device 103. An information management system control program 100 is provided to enable the computer system to retrieve, store and manipulate various data items and information from multiple sources in accordance with the present invention. The control program includes digital coded instructions for creating a local database (see FIG. 2) and for acquiring and displaying the acquired information via display device 103 in accordance with selected criteria input by the user. A display of information acquired from various selected sources by information management system control program 100 is accomplished, in part, through the use of conventional screen saver application programming techniques. A computer user may influence and interact with the operations of information management control program 100 through a conventional computer keypad or keyboard 102, a mouse device or other suitable I/O device. For convenience, information management system control program 100 may be embodied on any computer-readable medium (not shown) prior to execution by computer system 101–103. Information management system control program 100 acquires information from multiple user-selected sources such as conventional utility programs, user-defined data files, Internet and LAN/WAN sources as indicated by is blocks 104–111. Display/Interface routines, described below with respect to FIGS. 5A–5D, constitute part of control program 100 and provide the functional program process steps necessary for managing information by automatically acquiring, storing and displaying selected information during a "screen saver" mode of operation in accordance with selected criteria input by the user during a set-up mode of operation, as described in greater detail below.

In a preferred embodiment of the present invention, data compiled by conventional utility programs resident on a personal computer system is stored in a local resident database or accessed via source identification (e.g., location address) information contained in the local resident database by a Utility Programs Interface module/routine (FIG. 5D) portion of control program 100. For example, data compiled by one or more conventional e-mail utility programs 104 is accessed to produce a display of summary information such as Subject, Date, Sender and Recipient; information compiled by one or more conventional software utility "appointment" docketing programs 105, is accessed to produce a display of summary information such as Title, Time, Date, and Location; and, likewise, information compiled by conventional "task list" or other list creating type utility programs 106 is accessed to produce a display of the list data.

Specific user-defined information from multiple sources, as indicated at blocks 107–109, are accessed and displayed by a User-Defined Data Interface module/routine (FIG. 5A) portion of control program 100. For example, local or remote files 107 containing information used for studying and learning type activities, i.e., "learning files", are acquired from multiple distinct sources via a User-Defined Data Interface module/routine of control program 100. In an example embodiment of the invention, content acquired from learning files 107 is preferably displayed in a frequent repetitive manner to facilitate the user in learning and remembering specific information. Likewise, personal files 108, which may be pre-created by the user, are accessed via a User-Defined Data Interface routine. For example, data stored in specific "personal" files (e.g., files created and stored locally by the user) that contain information that may be of some particular importance to a user (such as, for example, data reflecting personal values or motivational information) is automatically acquired from those files and displayed at predetermined times by the User-Defined Data Interface routine. In a similar manner, local or remote "photo files" 109 containing photographic or graphic data are also automatically accessed and displayed by the same routine.

Figure 2:
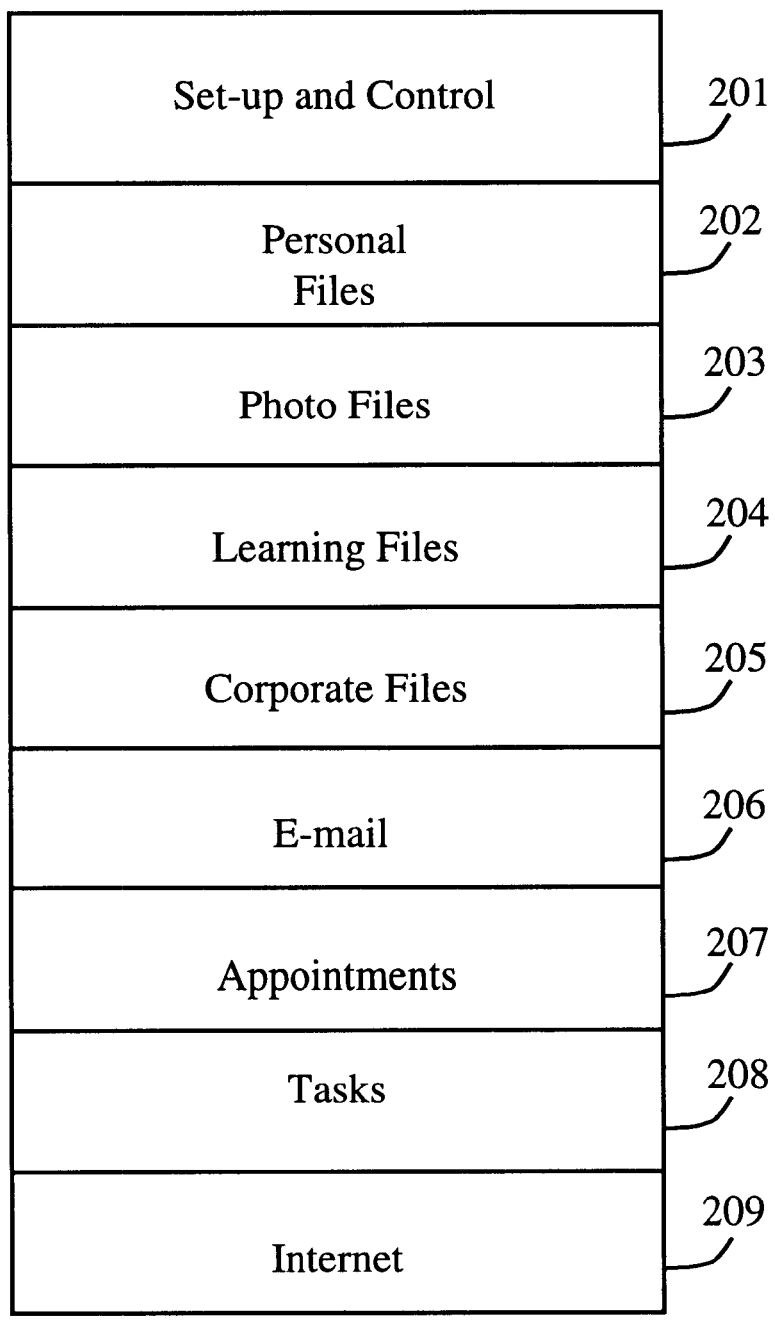
FIG. 2 is a schematic representation of the structural organization of an example system information database in accordance with the present invention.

Assuming host computer system 101–103 is provided with a communications link to the Internet, an Internet Interface module/routine (FIG. 5C) portion of control program 100, acquires and displays content from various Internet sites 110 by using URL addresses that are provided by the user and stored in a local database (see FIG. 2). In an example embodiment of the present invention, an input command via keyboard 102 during display of Internet site information, automatically deactivates control program 100 and activates a conventional web browser. For example, selected information content from World Wide Web sites identified by the user during a set-up process is automatically accessed and displayed such that the computer-user is routinely reminded of site updates and changes in web site content without the need to manually activate a separate web browser utility program.

Likewise, assuming host computer system 101–103 is provided with a communications link to a LAN or a WAN, a LAN/WAN interface module/routine (FIG. 5B) portion of control program 100 allows conventional personal computer or work stations that have the ability to connect to local and/or wide-area communications networks 111 to automatically retrieve and receive information from other computers connected to a common LAN/WAN. For example, with the LAN/WAN interface module, a user may set-up the information management system such that a corporate organization may disseminate specific information concerning business-unit performance or other organizational news via the LAN/WAN that is routinely acquired and displayed on computer systems connected to the LAN/WAN without the need for further activity on the part of the user of the recipient computer system.

FIG. 2 illustrates the basic structural organization of an example local memory resident database 200 for storage of control information and data in accordance with the present invention. For example, display criteria and other and control information (input by the user during the "set-up" mode of operation described below) is stored at 201 and subsequently used to control the general selection, format and display of acquired information during a "screen saver" mode of operation. Likewise, other storage areas are designated within local memory for storing information used by control program 100 for processing of user-defined files 202–204, storing information for processing LAN/WAN acquired data (e.g., "corporate files") 205, storing information for processing utility programs 206–208, and storing information for processing Internet acquired data 209.

Figure 3:
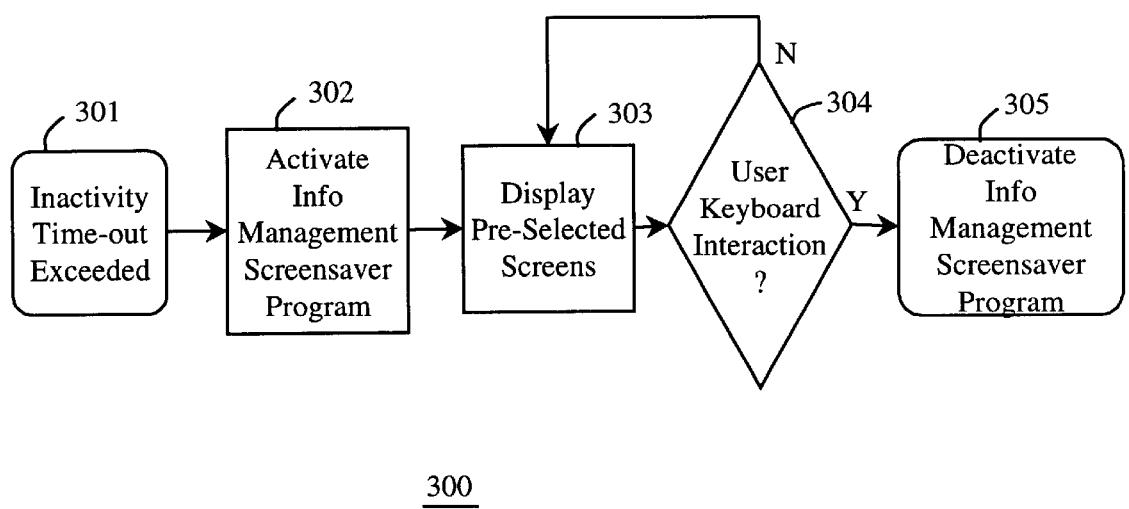
FIG. 3 is a system operation flowchart, which illustrates the general sequence of functional operations performed on a host computer in accordance with an example embodiment of the present invention.

FIG. 3 presents a process flow diagram 300 illustrating the sequence of basic functional operations performed by a host computer in accordance with the information management system of the present invention. After a predetermined selected time-out period of computer inactivity is exceeded, step 301, the information management control program of the present invention initiates a "screen saver" display mode of operation, as indicated at step 302. The portions of control program 100 for implementing the basic conventional screen saver type application functions, for example, for producing a bit-mapped or other "screen-saver" image window or "page" on the display device after a predetermined period of idle computer time set by the computer user, involve well known programming techniques and/or conventional software utilities and, therefore, are not further discussed in detail herein. Preferably, such portions are implemented in a manner that is compatible with the particular host operating system and processor 101.

In the screen saver mode, selected data is sequentially displayed in, for example, a bit-mapped graphics window (or "page") on display device 103 according to user-selected predetermined characteristics for a specified duration as indicated at block 303. For example, a first Personal File is accessed and displayed, followed by a first Photo File, followed by a first Learning File, and so on, until each information interface type has been displayed. The display of all the different information types at least once marks the completion of one "display cycle". A display cycle is then initiated to display a second Personal File, followed by a second Photo File, and so on until all files for each interface component have been displayed. Depending on the user-selected display characteristics, the order and the frequency of display of each information type may vary. For example, Personal Files may all be displayed first, followed by all Photo Files, and so on. Alternatively, a specific display sequence of interface modules or a random sequence may be selected. The user can deactivate the program at any time by keyboard or input device interaction or by double clicking with the system mouse 304, at which point, the display mode of the information management control program would then be deactivated, returning control to the computer operating system, as indicated at step 305.

Figure 4A:
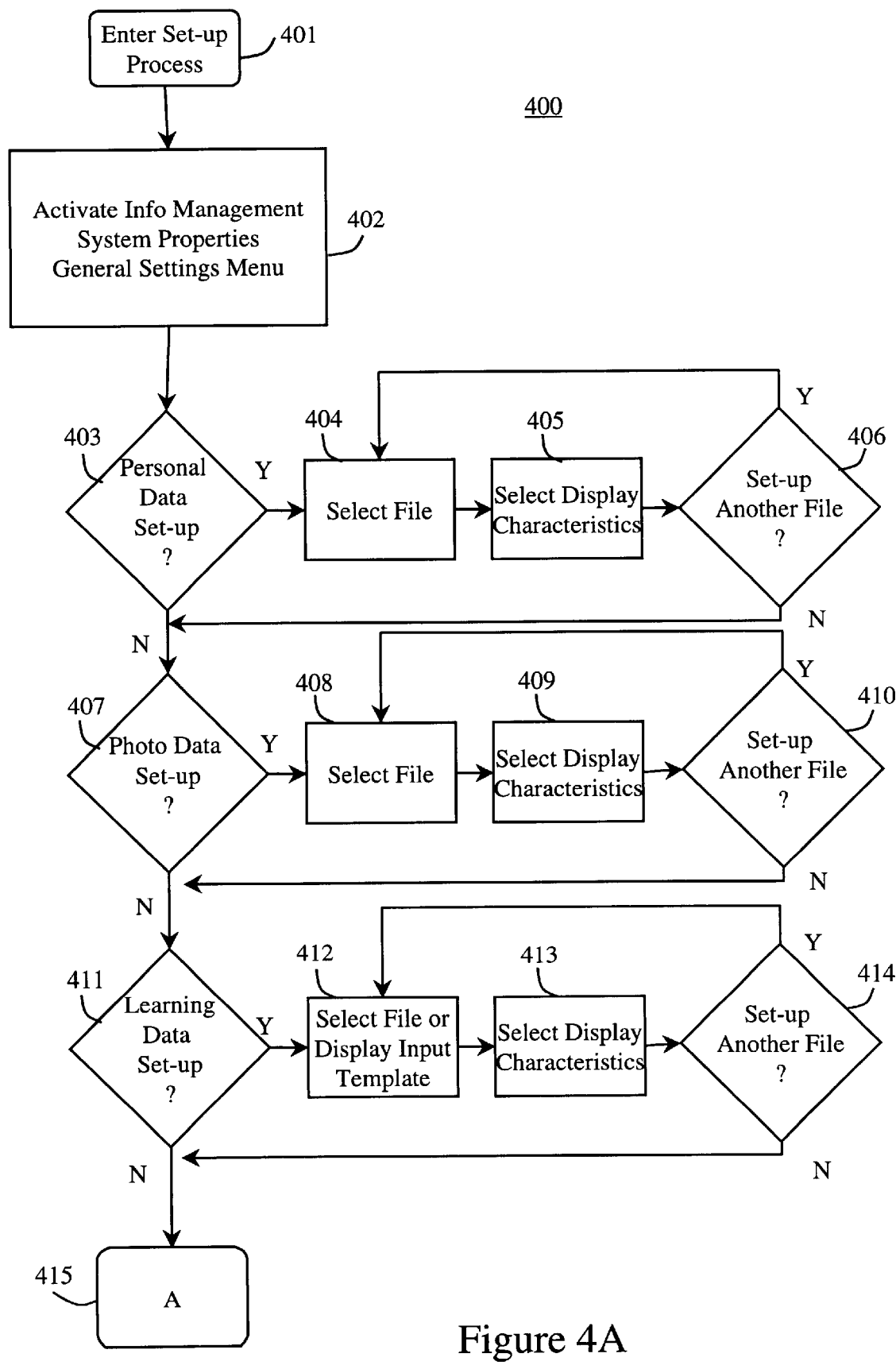
FIGS. 4A and 4B are flowcharts illustrating example functional program control steps performed by a Set-up process in accordance with the present invention.
Figure 4B:
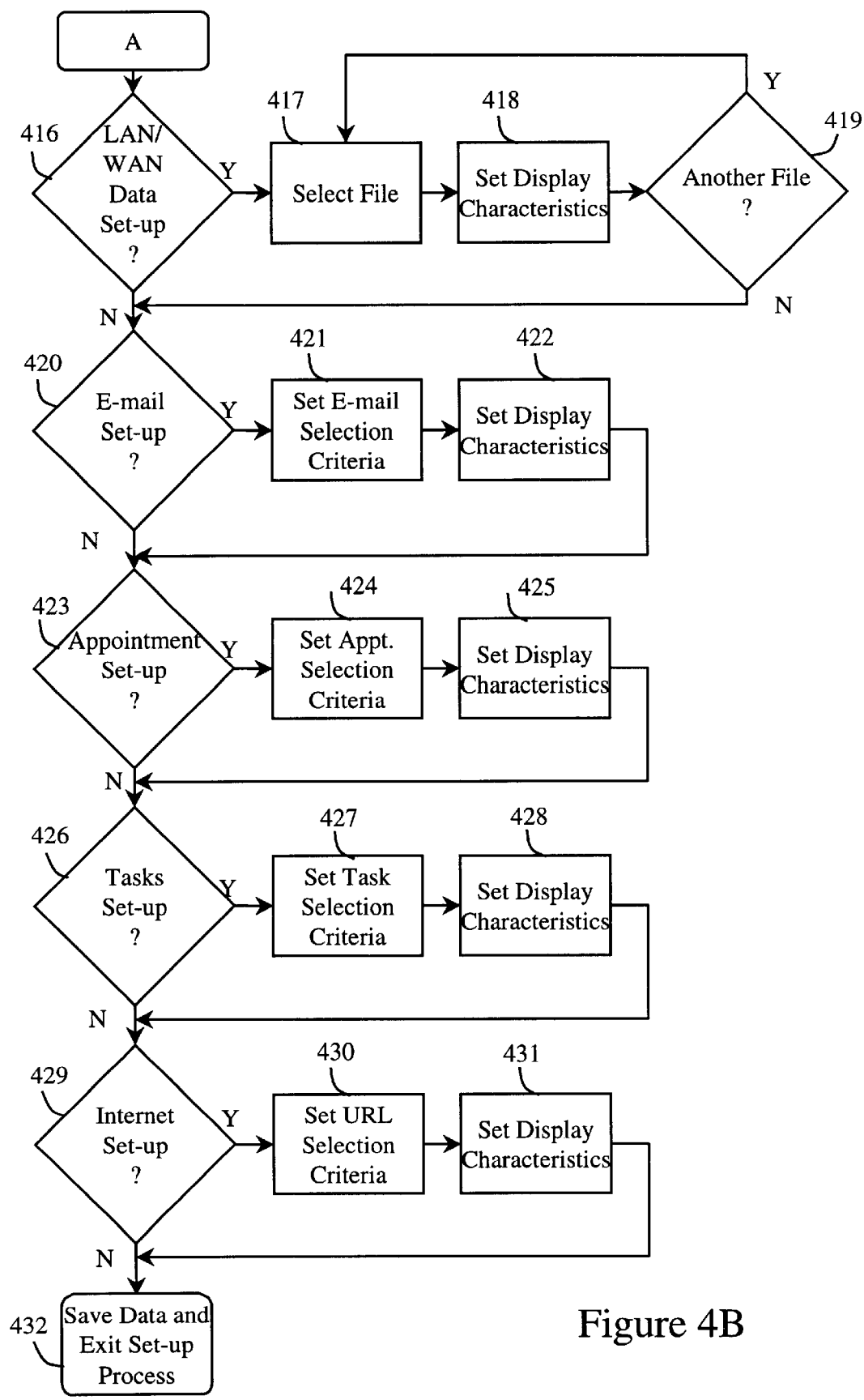

FIGS. 4A and 4B show the functional program control steps for implementing a set-up mode of operation in accordance with the present invention. Preferably, upon initial operation of the information management system, control program 100 enters a set-up mode 401 wherein input selection menus are displayed which prompt the user to input set-up criteria information via a plurality of screen "properties" input/selection menus (examples of which are depicted in FIGS. 6–14). The set-up mode may also be entered into manually at anytime, for example, by entry of a predetermined keyboard or mouse command. Using these input/selection menus the computer user makes display criteria selections and enters other information, for example, information concerning the location and types of information sources desired to be displayed during the screen saver mode of operation. For example, referring now to FIG. 4A at step 402, control program 100 initially displays a "General" settings input menu. (An example "General" settings input menu depicted is FIG. 6.) Using this general settings menu, the user can, for example, select which display/interface process routines (FIGS. 5A–5D) are used to acquire and display information during the screen saver mode or select the order in which the different display/interface process routines display information during the screen saver mode. Moreover, the "General" settings menu provides the user with summary information concerning the general settings for each display/interface process routine, such as the display duration or "refresh" rate for displaying each bit-mapped image, the selected display cycles, the selected font and the current display activity status (e.g., display active/display not active).

Next, beginning with for example, a Personal Data set-up procedure 403, the user is prompted by an input menu display to input a file name and location (step 404) for retrieving selected user-defined files to be obtained locally from storage or from a designated remote location. Next, at step 405, various display characteristics for each bit-mapped graphics "page" of information displayed during the screen saver mode, such as for example, page title, page color, display duration and frequency, font size and color, are set after being selected and entered into the input menus by the user. In similar fashion, the user repeats these operations for additional files in step 406, or exits the Personal Data set-up function and proceeds to the set-up process for the next display type, such as Photo Data set-up 407. Next, at steps 408 and 409, the user repeats a similar file selection input process and selection of display page characteristics as discussed with respect to the Personal Data set-up feature. Next, at step 410, additional files are selected or set-up processing continues with Learning Data set-up 411. Next, at step 412, the user again repeats the above file selection process or enters content directly into a learning display input template provided on the display. Next, the user again selects display page characteristics at step 413. This process is repeated for additional files then processing proceeds at 414 to the next set-up process such as the LAN/WAN Data set-up.

Referring now to FIG. 4B, LAN/WAN Data set-up processing is similar to the previous set-up procedures. In step 416, it is determined if the LAN/WAN Data set-up process is needed. The user first selects the file for display in step 417 and in step 418 the display page characteristics are selected. Next, the user selects another LAN/WAN Data file at step 419 or if all files have been selected, then processing proceeds to another set-up function, such as E-mail Set-up feature 420. The user selects the e-mail selection criteria in step 421, which is similar to the selection criteria used in previous set-up features discussed above. In addition, the user can input "filter" criteria to limit the acceptance or acquisition of E-mail to certain specific criteria, such as E-mail received within a specified time period or other similar criteria. The user then selects the page display characteristics in step 422, as in the previous set-up procedures.

Likewise, Appointment Set-up processing 423 repeats a similar process. Appointment selection criteria is input at step 424 by the user to determine parameters for accessing appointment data. For example, the number of days to look ahead or behind from the current day can be specified so that only selected appointments are accessed. Next, at step 425, the user selects the display page characteristics as with the previously described set-up features. At Task Set-up processing, step 426, personal task data is selected. Task selection criteria are entered by the user at step 427 and are similar to Appointment set-up criteria. Set-up criteria input by the user may include, for example, the number of days to "look ahead" from the current day to access individual tasks for display, the task priority, and whether or not the task has been started. Next, at step 428, the user selects the page display characteristics.

Next, at Internet Set-up feature steps 429 and 430, the user is prompted via a display menu (FIG. 14) to select individual Internet URL criteria. This may include the identification of specific Internet sites that a user wishes to monitor routinely. It may also include pre-selected Internet content providers that have specific data to be displayed. Next, the page display characteristics are selected at step 431. The set-up data is next saved at step 432 and the set-up mode is then exited.

Figure 5A:
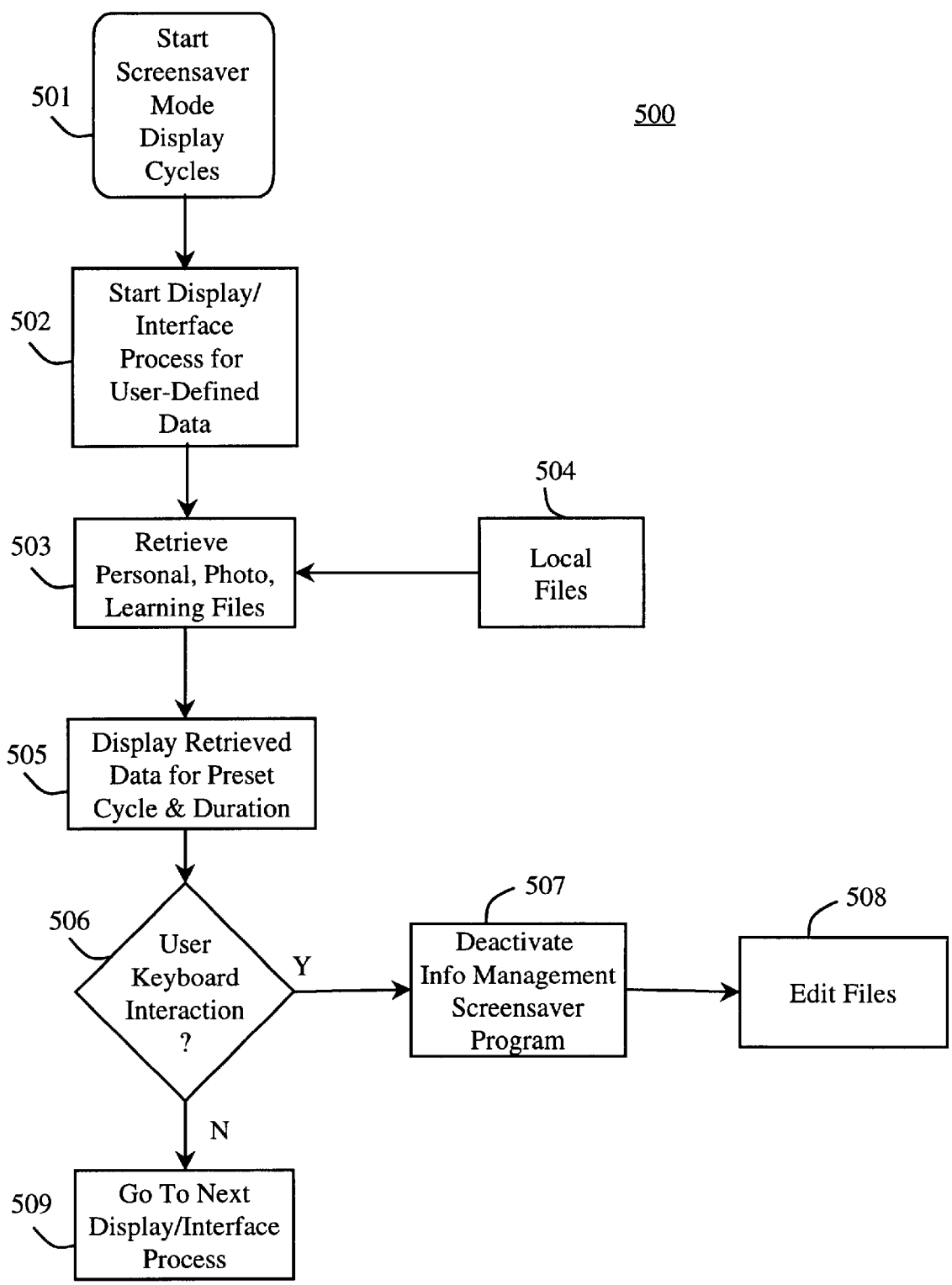
FIG. 5A is a flowchart illustrating example functional program control steps performed by a User-Defined Interface display/interface process in accordance with the present invention.

FIGS. 5A–5D show example program functional step flow diagrams for each of the interface routines or "modules" of the present invention. FIG. 5A is an example program functional step flow diagram 500 for the User-Defined Data Interface module. Each of the described interface routines is "modular" in the sense that it may be omitted from the control program if the particular type of information or data for which it is tailored to interface is not desired. After host computer system 101–103 has been inactive (idle) for a predetermined period, the screen saver mode of the information management system control program 100 is activated, as indicated at step 501. Next, the User-Defined data phase is activated at step 502. The program starts displaying the user-defined interface module according to predetermined set-up criteria. Next, at step 503, user-defined personal, photo or learning files are accessed and retrieved using the file location identified in set-up and stored in the program database 200, as described previously. These files and data are retrieved from the local files stored on the user's computer at step 504. Next, at step 505 the retrieved data is displayed for the pre-set duration. At step 506, the detection of a keyboard input device or mouse command initiates step 507 to deactivate the screen saver module. The specific retrieved file may subsequently be utilized in step 508 for editing using, for example, a native file editing program. For example, a user could access a text file to edit its content immediately to capture a new concept or idea related to the file content. Next, at step 509, if there are other information types remaining to be displayed, a different display interface process is started; otherwise, a new display cycle is initiated beginning again at step 501. The specific display sequence is based on the set-up information described previously and may vary according to user-defined criteria.

Figure 5B:
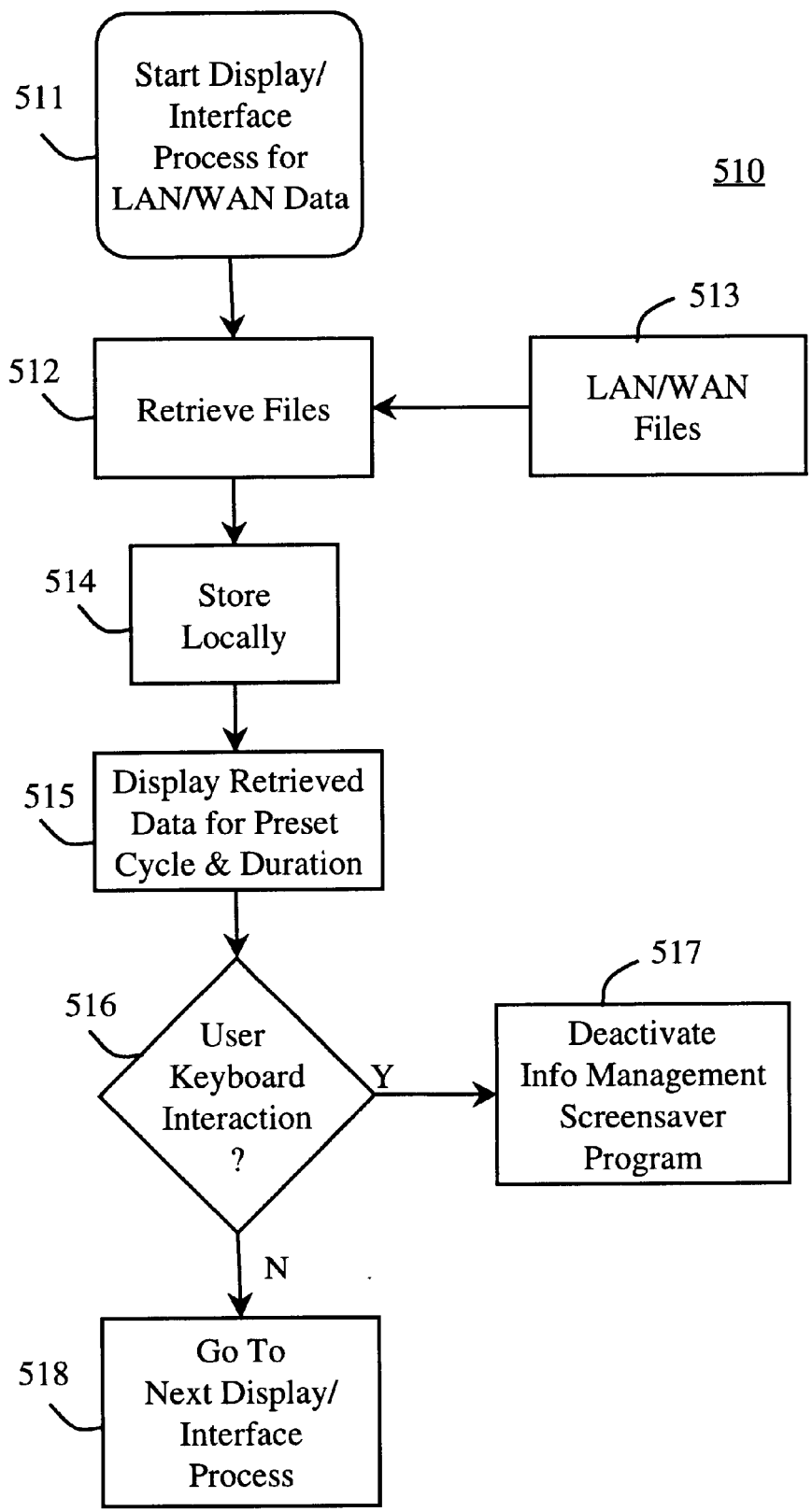
FIG. 5B is a flowchart illustrating example functional program control steps performed by a LAN/WAN Interface display/interface process in accordance with the present invention.

FIG. 5B shows an example flow diagram for LAN/WAN interface module 510. In step 511 the screen saver display mode for the LAN/WAN interface module is entered according to the program set-up criteria, described previously. Next at step 512, file or data retrieval is initiated. Remotely stored files or data 513 are accessed, for example, via either Local or Wide Area Network communication links coupled to computer system 10. The retrieved information is stored locally, step 514, and then displayed at step 515. The file and network locations are identified during the set-up process and stored in program database 200, as described previously. The source file content is controlled by a designated system administrator and cannot be modified by the user. Modifications to the source file are reflected on the user's display in the next screen saver cycle, so that central information can be distributed to multiple users. In step 515 the user can use a keyboard or input device or mouse command and the screen saver module is deactivated in step 516. Next in step 517 the next interface process begins.

Figure 5C:
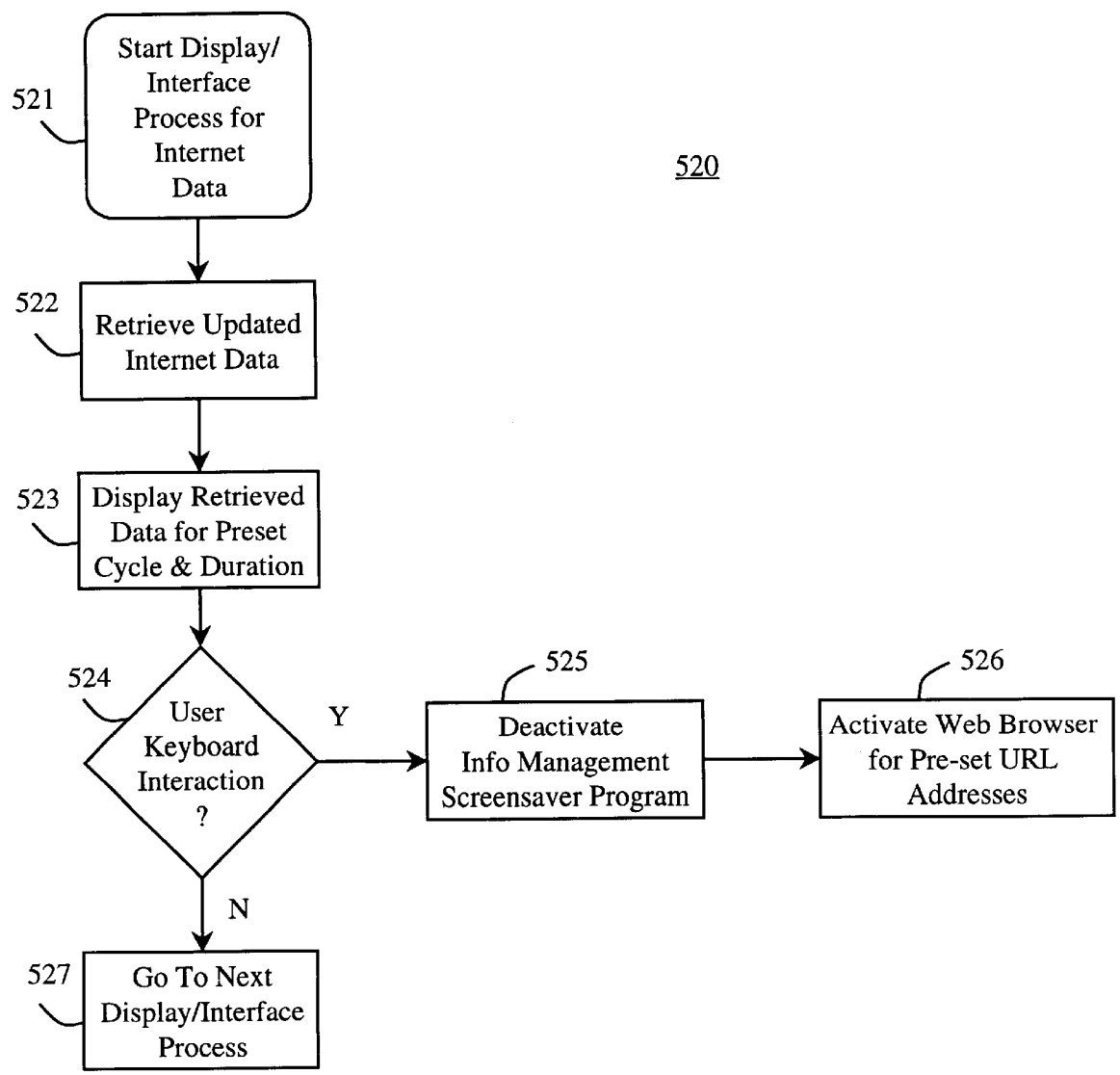
FIG. 5C is a flowchart illustrating example functional program control steps performed by an Internet display/interface process in accordance with the present invention.

FIG. 5C shows an example flow diagram for Internet Interface module 520. The screen saver display mode for the Internet module is initiated at step 521. Next, at step 522 Internet URL site addresses are displayed based on the set-up criteria stored in the program database 200. In addition, specific Internet data may also be retrieved, also based on the set-up data. At step 523 the program starts to display the Internet data according to the program set-up criteria. World Wide Web site names and URL addresses are displayed that have been identified in the set-up process and stored in program database 200. If specified during the program set-up, selected content from World Wide Web sites can also be accessed and displayed that supplements or is associated with the selected World Wide Web sites. In this way, critical information identified by the user can be managed and remembered. For example, a travel or airline company site name can be listed, in conjunction with specific airline flight arrival or departure times, or an Internet auction site can be listed in conjunction with results of Internet auction requests, and the like. At step 524 a keyboard or input device or system mouse command can be initiated by a click on the URL site name. This initiates step 525 which deactivates the information management screen saver program, and activates an external web browser at step 526. In this way, the user can immediately open the World Wide Web site. Next, at step 527 the next interface process is initiated.

Figure 5D:
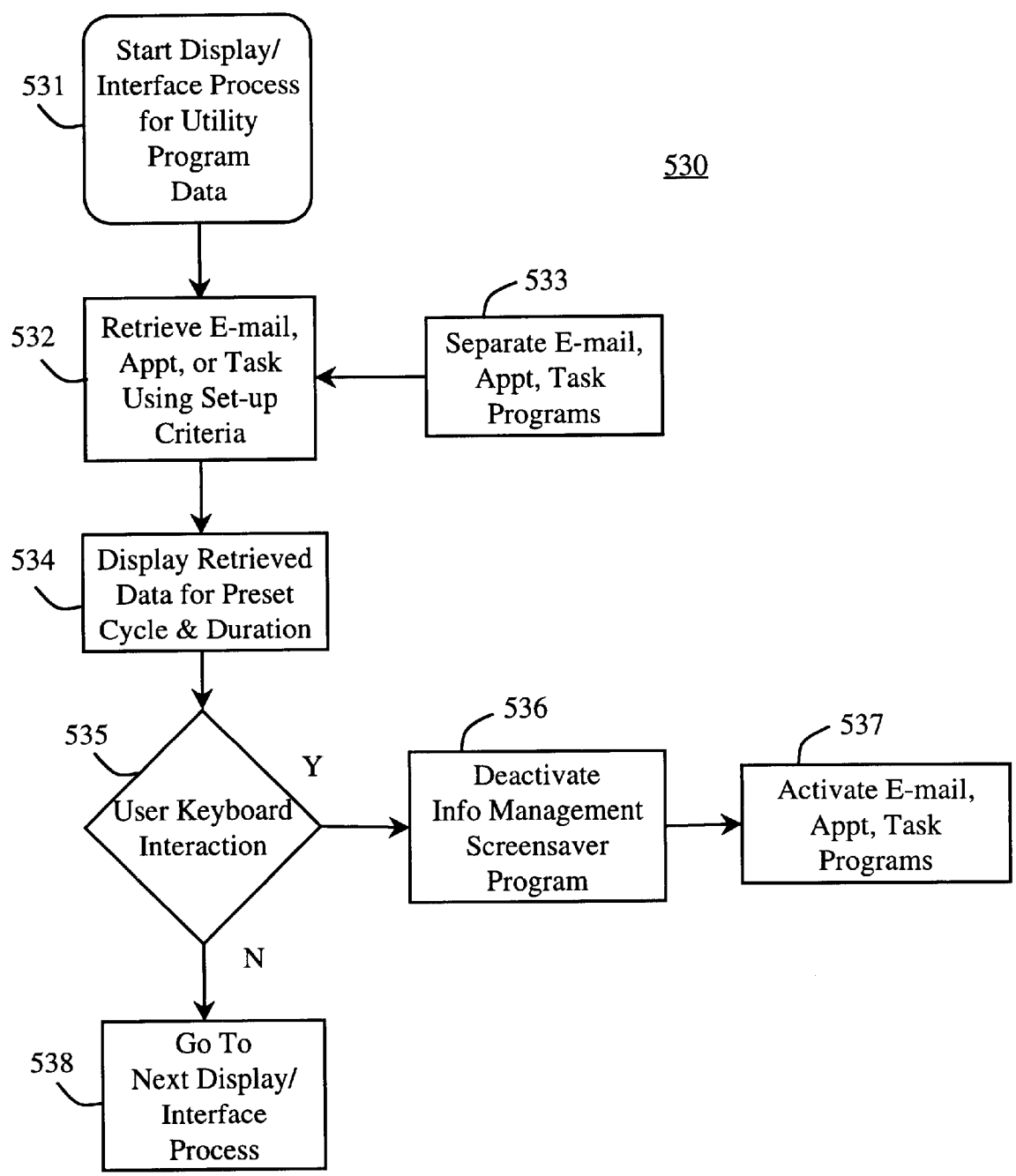
FIG. 5D is a flowchart illustrating example functional program control steps performed by a Utility Program display/interface process in accordance with the present invention.

FIG. 5D shows an example flow diagram 530 for the External Utility Programs interface. At step 531 the screen saver mode for the utility interface module is initiated. Next, at step 532 the display data criteria are retrieved from the program database 200. This criteria is used to access and retrieve the various external e-mail, appointment, or task data in step 533. Next, at step 534 the summary information from the external utility program is displayed according to the set-up data stored in program database 200. For example, summary information can consist of individual e-mail subject, date, sender, recipient and the like. This information is stored in the external e-mail, appointment and task programs and is accessed for display in the pre-selected sequence, as defined in the program set-up module. For example, information from an e-mail utility program would be displayed, followed by information from an external appointment program, and then by information from an external task utility program. At step 535, the user can use a keyboard or input device command or the system mouse which leads to step 536 where the information management screen saver program is deactivated. This is followed by step 537 were the utility program is activated. This allows the user to immediately activate the utility e-mail, appointment or task program to add, modify or react to information in response to ideas triggered by display of the information. This feature improves personal responsiveness and helps manage new ideas and information. At step 538 the next interface process is initiated and the program interface cycle repeats the display using the criteria specified in the set-up program until the screen saver module is deactivated.

Figure 6:
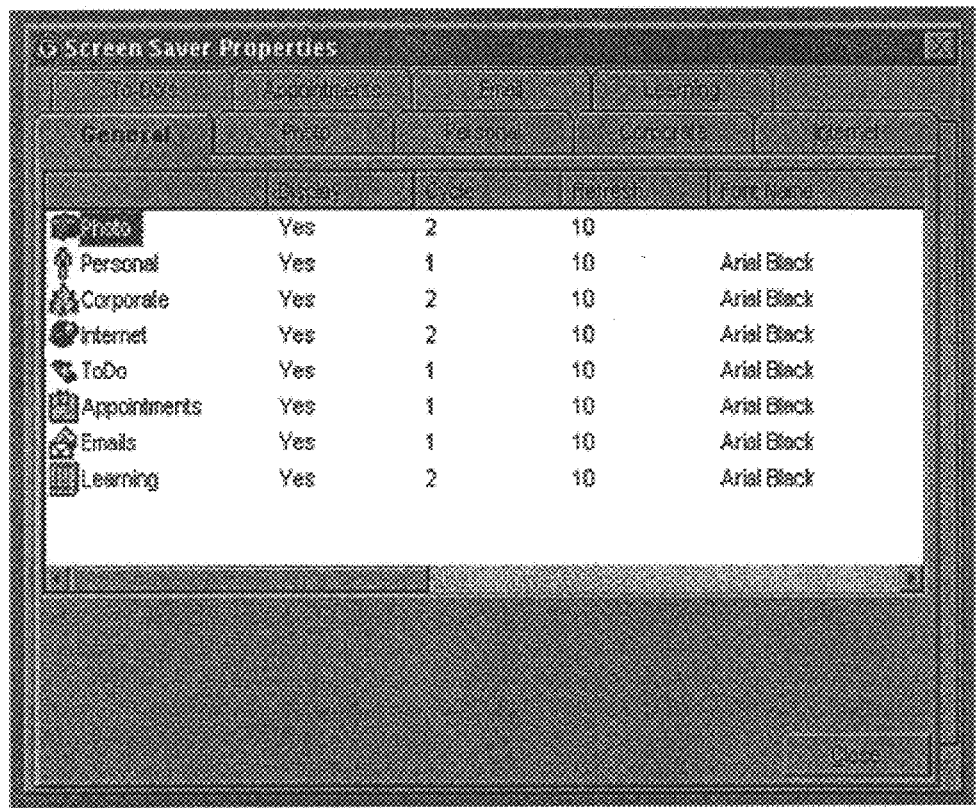
FIG. 6 is an illustration of a bitmap display image of an example set-up process menu for viewing and setting General properties of the information management system in accordance with the present invention.

FIG. 6 shows an example set-up process menu of a "General" settings display menu. In this example menu display, summary information and operational status for each display/interface module is presented in a displayed list with a corresponding icon. The order in which the display/ information process routines are performed (i.e., the sequence for displaying information acquired) corresponds to the top-down order of items displayed in the list. A user may alter the display order by, for example, using a mouse device and "dragging" the corresponding icons to a different desired position. This "General" settings menu is also used to show summary information concerning image display duration (or "refresh" period), display cycle frequency, and font type. The user can activate an individual set-up display menu, for example, by using a mouse interface device and double clicking on a listed display/information process routine title or by selecting an appropriate menu "tab" displayed at the top portion of the menu.

Figure 7:
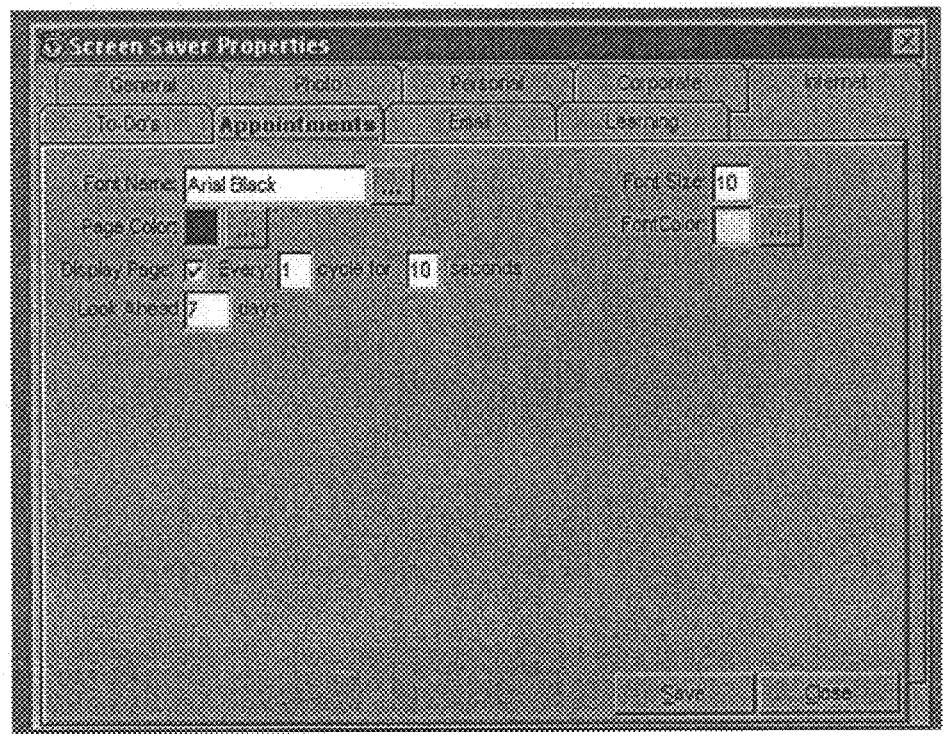
FIG. 7 is an illustration of a bitmap display image of an example of setup up process menu for viewing and setting Appointments display/interface process properties of the information management system in accordance with the present invention.
Figure 8:
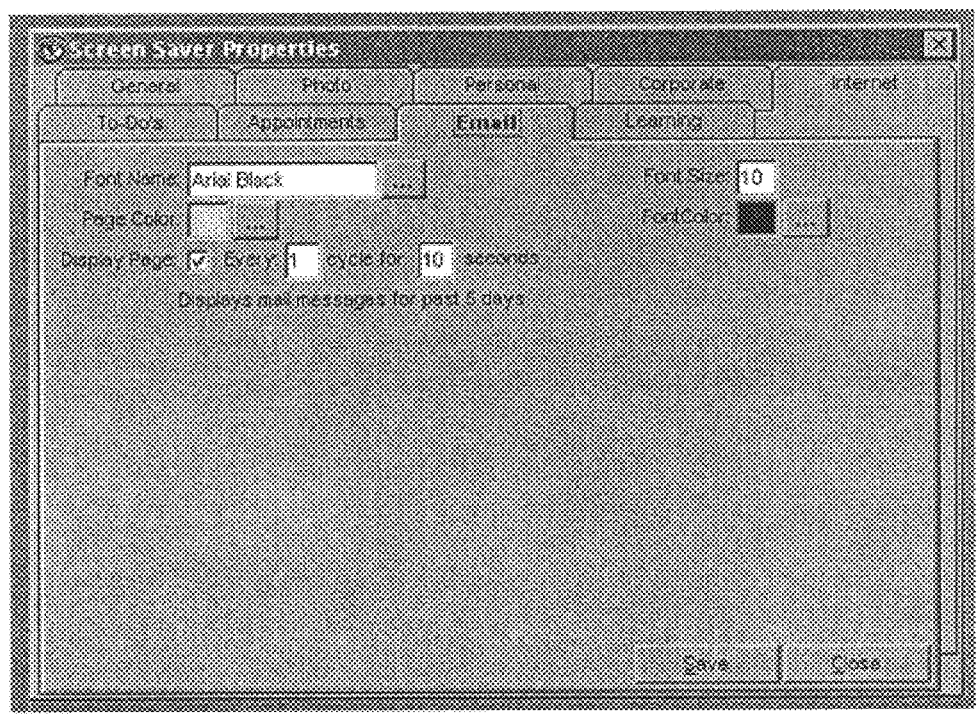
FIG. 8 is an illustration of a bitmap display image of an example of setup process menu for viewing and setting Email properties of the information management system in accordance with the present invention.
Figure 9:
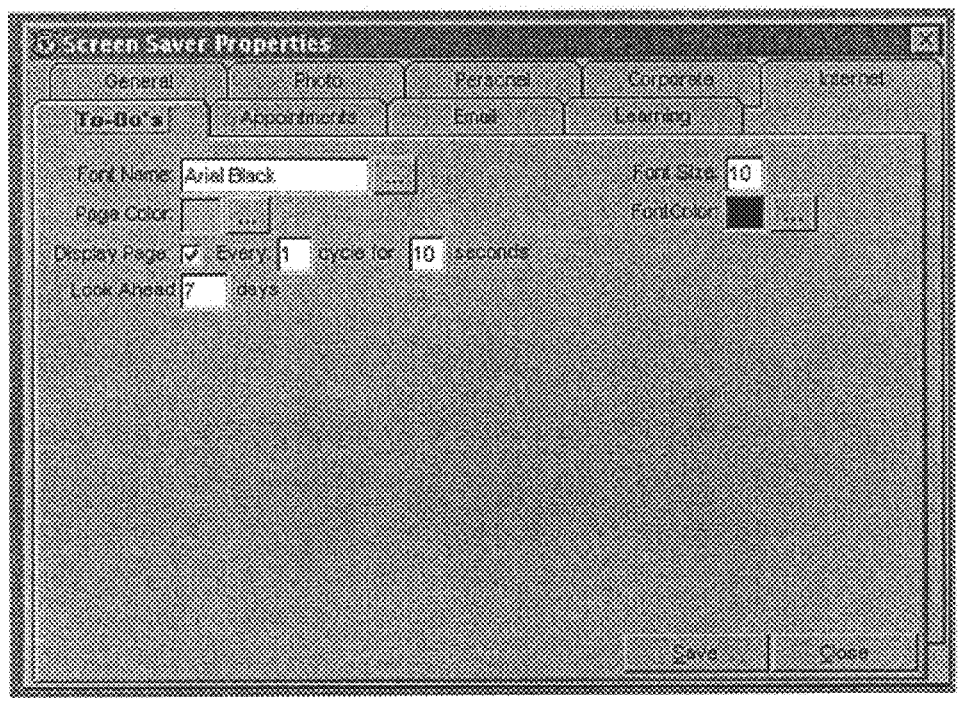
FIG. 9 is an illustration of a bitmap display image of an example of set-up process menu for viewing and setting To Do (task list) display/interface process properties of the information management system in accordance with the present invention.
Figure 10:
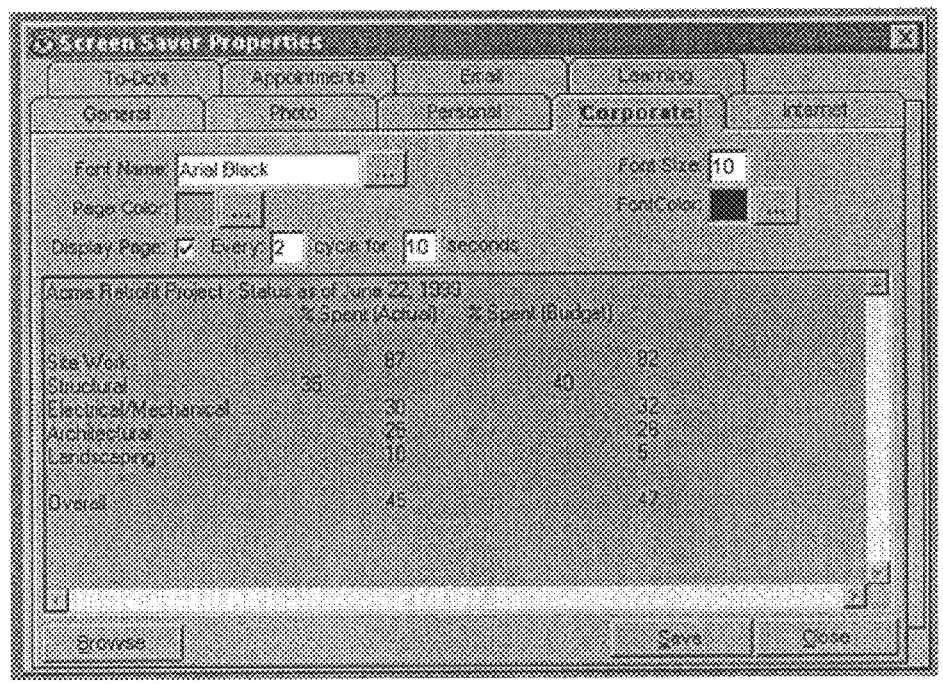
FIG. 10 is an illustration of a bitmap display image of an example of set-up process menu for viewing and setting Corporate (LAN/WAN) display/interface process properties of the information management system in accordance with the present invention.
Figure 11:
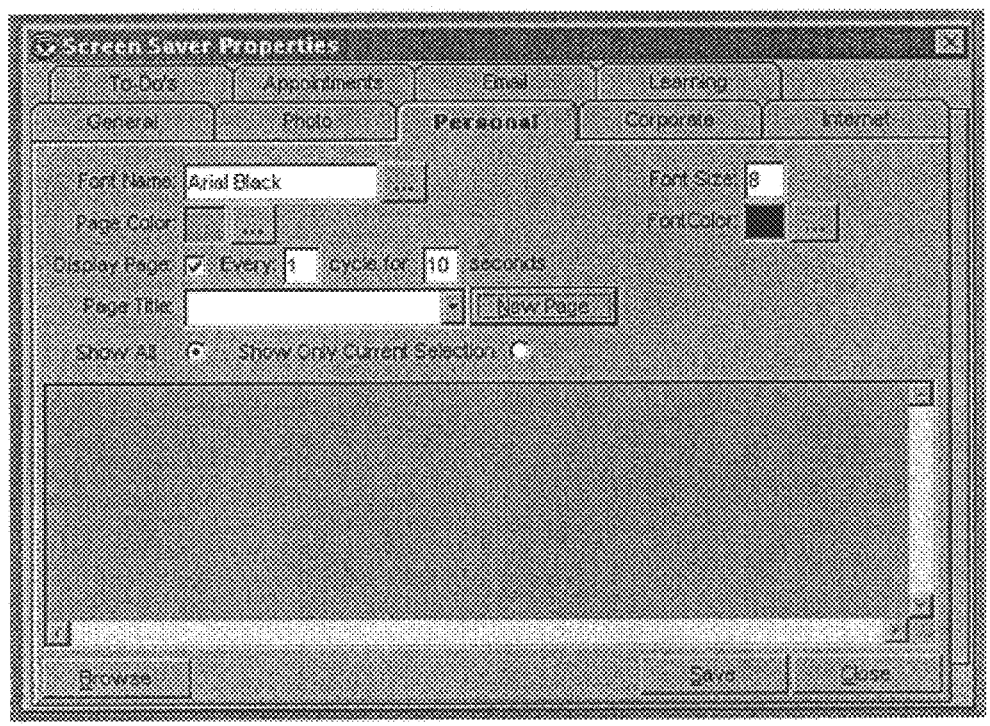
FIG. 11 is an illustration of a bitmap display image of an example of set-up process menu for viewing and setting Personal display/interface process properties of the information management system in accordance with the present invention.
Figure 12:
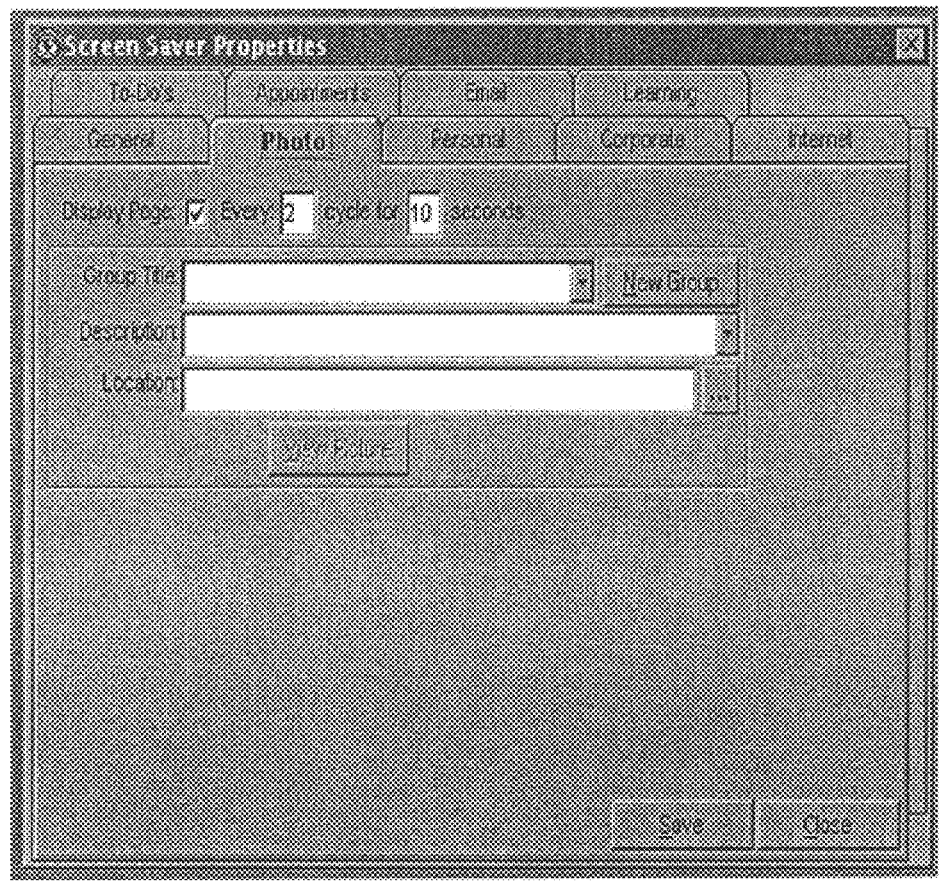
FIG. 12 is an illustration of a bitmap display image of an example of set-up process menu for viewing and setting Photo display/interface process properties of the information management system in accordance with the present invention.
Figure 13:
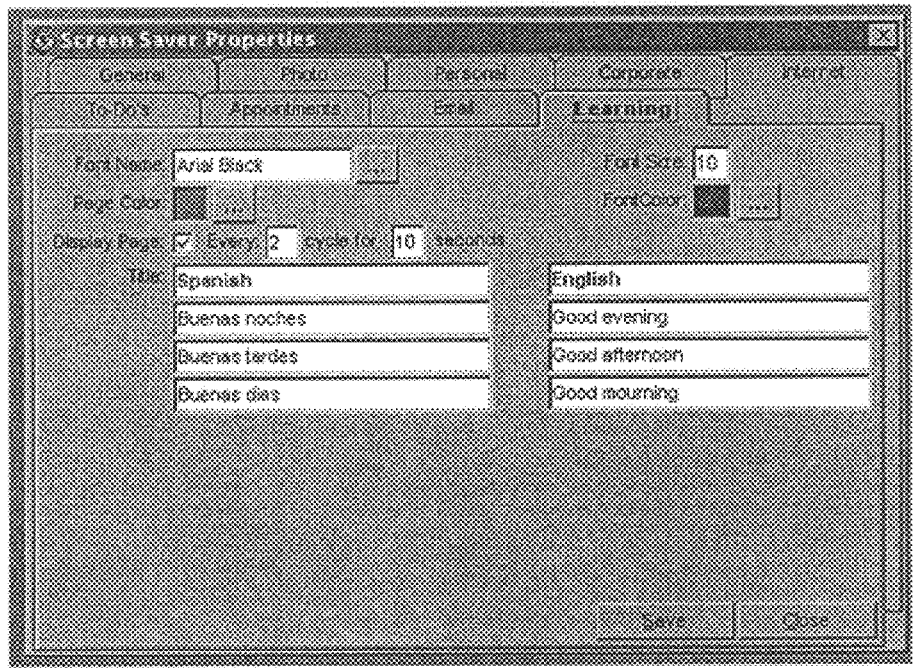
FIG. 13 is an illustration of a bitmap display image of an example of set-up process menu for viewing and setting Learning display/interface process properties of the information management system in accordance with the present invention.
Figure 14:
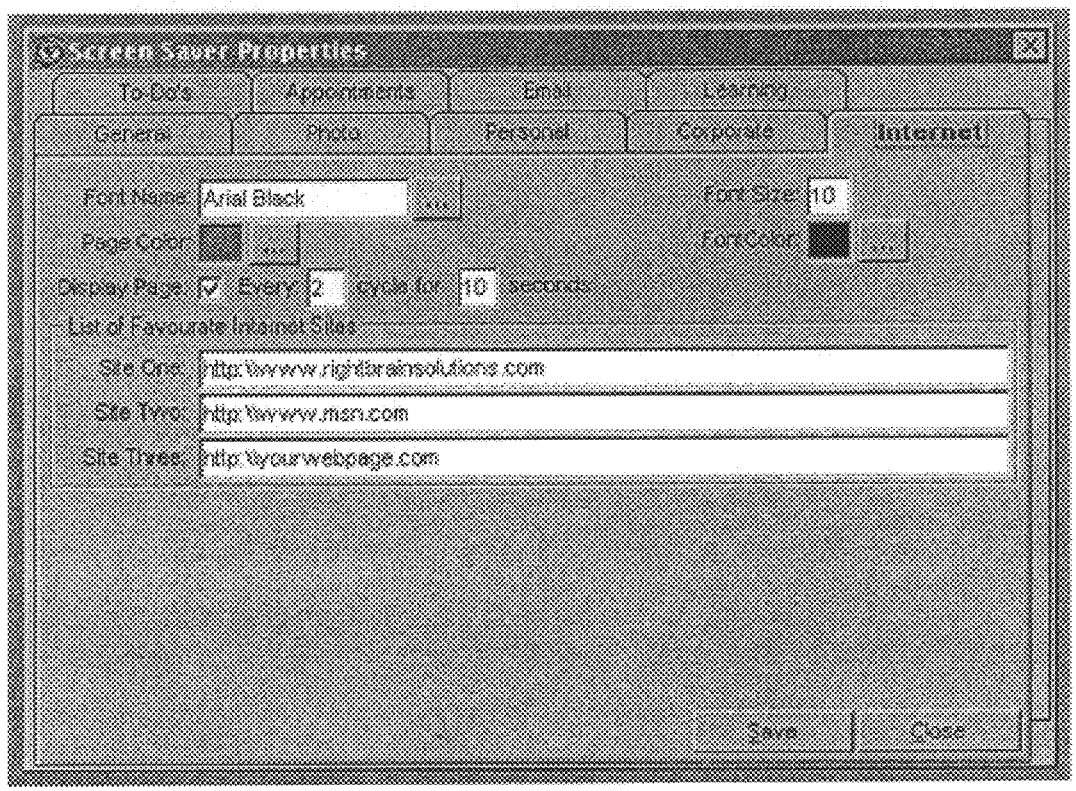
FIG. 14 is an illustration of a bitmap display image of an example of set-up process menu for viewing and setting Internet display/interface process properties of the information management system in accordance with the present invention.

Examples of the individual set-up process menus for each interface module are shown in FIGS. 7 through 14. FIG. 7 shows an example set-up input menu for the Appointments module for entering/changing selection criteria for display page color, font characteristics, display selection, display cycle and duration, and the number of days to "look ahead" to filter appointments are displayed. FIGS. 8 and 9 respectively show example set-up menus for entering/selecting similar data acquisition and display criteria for the E-mail module and the To-Do (task) module. Likewise, an example of the LAN/WAN module set-up menu for entering/changing data acquisition and display criteria is shown in FIG. 10. In addition to the input/selection criteria features of other menus, the LAN/WAN set-up menu also contains a "browse" feature to select remote files to be displayed. FIG. 11 shows an example set-up menu for the User-defined module for entering/changing selection criteria for displaying "personal" information. In addition to the input/selection criteria features of other menus, the User-defined settings menus includes a list of one or more "personal" files that can be selected independently for display. FIG. 12 shows an example set-up menu for the Photo display/interface module for entering/changing selection criteria for display characteristics, description of photographs, and location of the individual file may be shown. FIG. 13 shows an example setup input menu for entering/changing selection criteria the for Learning display/interface module that contains a "browse" feature to enter or select remote files to be displayed. Optionally, "learning" data can be entered directly using a data entry template, as shown. FIG. 14 shows an example setup menu for entering/changing selection criteria for the Internet display/interface module. Using this set-up menu, specific Internet site URL addresses are entered directly by the user.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of utilizing a personal computing device for managing personal and/or group networked information, the personal computing device having a central processing unit (CPU), a display, an I/O interface for inputting information and/or communicating with computer network information sources, and a memory for local storage of program instructions and data, comprising the steps performed by the personal computing device of:

a) displaying one or more input settings menus, said menus displaying selection prompt and input windows for entering criteria for acquiring and displaying information in one or more screen-saving display modes;

b) automatically acquiring data from one or more information sources based on criteria entered into to said settings menus; and c) sequentially displaying one or more screen-saving display images comprising data acquired from said information sources whenever the computer system is idle longer than a predetermined period, wherein the personal computing device automatically acquires data from local and/or network sources for presenting the data in one or more screen-saving display images and wherein images of data acquired from said information sources are sequentially displayed in a manner based on criteria entered to said settings menus.

2. The method as set forth in claim 1, wherein the step of automatically acquiring data includes acquiring email content that is stored or produced by an email application program and wherein acquired email content is displayed in at least one screen-saver screen image.

3. The method as set forth in claim 1, wherein the step of automatically acquiring data includes acquiring personal appointment information content stored or produced by other program applications and wherein acquired appointment information content is displayed in at least one screen-saver screen image.

4. The method as set forth in claim 1, wherein the step of automatically acquiring data includes acquiring "to-do list" information content stored or produced by other program applications an wherein acquired "to-do list" information content is displayed in at least one screen-saver screen image.

5. The method as set forth in claim 1, wherein the step of sequentially displaying images after the computing device is idle for a predetermined period provides a screen-saver mode of operation for said computing device and further comprises the step of activating a particular application program in response to a predetermined mouse and/or keyboard activity by a user while the system is operating in said screen-saver mode, wherein the user is provided with direct access to a specific selected application.

6. The method as set forth in claim 1, wherein the step of sequentially displaying images after the computing device is idle for a predetermined period provides a screen-saver mode of operation and the step of automatically acquiring data includes acquiring data from information sources via LAN/WAN or an Internet communications link.

7. The method as set forth in claim 6, further comprising the step of displaying information acquired from different information sources in separate individual screen-saver display views.

8. The method as set forth in claim 6, further comprising the step of periodically updating individual screen-saver views new information acquired from said information sources.

9. A computer screen-saver program product, embodied on a computer-readable medium for distribution and/or storage on a computing system or like device having a display, for managing personal and computer network accessible information, comprising:

a) instruction means for displaying one or more input settings menus, said menus displaying selection prompts and input windows for entering criteria to be used by the screen-saver program for acquiring data from one or more information sources and displaying the acquired data in one or more screen-saving display modes;

b) instruction means for automatically acquiring data from one or more information sources based on criteria entered by a user into said settings menus; and c) instruction means for displaying one or more screen-saving display images comprising data acquired from said information sources whenever the computer system is idle longer than a predetermined period, wherein the computing system automatically acquires data from local and/or network sources for presenting the data in one or more screen-saving display images and wherein images of data acquired from said information sources are sequentially displayed in a manner based on criteria entered to said settings menus.

10. A screen-saver program product as set forth in claim 9, wherein the instruction means for automatically acquiring data from one or more information sources includes instruction means for automatically acquiring email content stored or produced by an email application program and wherein acquired email content is displayed in at least one screen-saver screen image.

11. A screen-saver program product as set forth in claim 9, wherein the instruction means for automatically acquiring data from one or more information sources includes instruction means for automatically acquiring personal appointment information content stored or produced by other program applications and wherein acquired appointment information content is displayed in at least one screen-saver screen image.

12. A screen-saver program product as set forth in claim 9, wherein the instruction means for automatically acquiring data from one or more information sources includes instruction means for automatically acquiring "to-do list" information content stored or produced by other program applications an wherein acquired "to-do list" information content is displayed in at least one screen-saver screen image.

13. A computer system for managing personal and computer network accessible information, said system including a computer device having a central processing unit (CPU), a display, an I/O interface and a memory for local storage of program instructions and data, comprising:
    means for displaying one or more input settings menus, said menus displaying selection prompts and input windows for entering criteria to be used by the computer system for acquiring and displaying data acquired from one or more information sources;
    means for automatically acquiring data from a plurality of information sources and displaying the acquired data in one or more screen-saving display images based on criteria input by a user to said settings menus; and
    means for sequentially displaying images of data acquired from said plurality of information sources after the computer system is idle for a predetermined period, wherein the computer system automatically acquires data from local and/or network sources for presenting the data in one or more screen-saving display images and wherein images of data acquired from said information sources are sequentially displayed in a manner based on criteria entered to said settings menus.

14. The computer system of claim 13 wherein the means for automatically acquiring data from a plurality of information sources includes data acquisition means for automatically accessing email from other applications and displaying said email in a screen-saver display mode of operation.

15. The computer system of claim 13 further comprising data acquisition means for automatically acquiring personal appointment information stored or produced by other program applications, wherein acquired personal appointment information is displayed in at least one screen-saver screen image.

16. The computer system of claim 13 further comprising data acquisition means for automatically acquiring "to-do list" information content stored or produced by other program applications, wherein acquired to-do list information content is displayed in at least one screen-saver screen image.

17. The computer system of claim 13 further comprising data acquisition means for automatically acquiring email information content stored or produced by other program applications, wherein acquired email content is displayed in at least one screen-saver screen image.

18. The computer system of claim 13 wherein the means for sequentially displaying images after the computer system is idle for a predetermined period provides a screen-saver mode of operation for said computer system and further comprises a display view control means for activating a particular application program in response to a predetermined mouse and/or keyboard activity by a user while the system is operating in said screen-saver mode, wherein the user is provided with direct access to a specific selected application from the screen-saver mode.

19. The computer system of claim 13 wherein the means for sequentially displaying images after the computer system is idle for a predetermined period provides a screen-saver mode of operation for said computer system and further comprises a means for acquiring data from information sources accessible via LAN/WAN or Internet.

20. The computer system of claim 13 wherein the means for sequentially displaying images after the computer system is idle for a predetermined period provides a screen-saver mode of operation for said computer system and further comprises a means for displaying data acquired from different information sources in individual screen-saver screen views and for automatically owing and displaying updated data for each screen-saver screen view displayed.

21. The computer system of claim 13 wherein the means for sequentially displaying images after the computer system is idle for a predetermined period provides a screen-saver mode of operation for said computer system and further comprises a means for automatically displaying email information from multiple sources within a single screen view.

22. The computer system of claim 13 wherein the means for sequentially displaying images afar the computer system is idle for a predetermined period provides a screen-saver mode of operation for said computer system and further comprises a means for providing an interactive tutorial/ educational learning tool during said screen-saver mode of operation wherein displayed screen views comprise tutorial/ educational material information content and are updated win new tutorial/educational material information content whenever a user provides or makes predetermined appropriate input selections.

23. A computer implemented information management system for displaying and managing personal and/or group networked information, the system including a personal computing device connected to one or more external information sources through a digital communications link and having at least one display device, the computing device programmed to:
    accept information selection and set-up criteria input by a user;
    acquire data from one or more information sources based on said selection and set-up criteria; and
    sequentially provide one or more screen display views comprising data acquired from said information sources whenever the computer system is idle longer than a predetermined period, wherein the personal computing device automatically acquires data from local and/or digital communications network sources for presenting the data in said one or more screen views and wherein images of data acquired from said information sources are displayed in a manner based on criteria entered to said settings menus.

* * * * *